UNITED STATES PATENT OFFICE.

RICHARD KIRCHHOFF, OF GROSS-LICHTERFELDE, AND LEO KERKOVIUS, OF FRIEDENAU, GERMANY, ASSIGNORS TO ACTIEN GESELLSCHAFT FUR ANILIN FABRIKATION, OF BERLIN, GERMANY.

VIOLET-COLOR LAKE AND PROCESS OF MAKING SAME.

No. 820,052.     Specification of Letters Patent.     Patented May 8, 1906.

Application filed October 17, 1905. Serial No. 283,193.

*To all whom it may concern:*

Be it known that we, RICHARD KIRCHHOFF, of Gross-Lichterfelde, near Berlin, and LEO KERKOVIUS, of Friedenau, near Berlin, in the Kingdom of Prussia, German Empire, have invented new and useful Improvements in the Manufacture of Violet-Color Lakes and Processes of Making Same; and we do hereby declare that the following is a full, clear, and exact description of the invention, which will enable others skilled in the art to which it appertains to make and use the same.

We have found that one can obtain valuable violet-color lakes from the monoazo dyestuff which is produced by combining the diazo compound of the para-amidophenyl-1.2-naphthyl-triazol-3.8-disulfonic acid

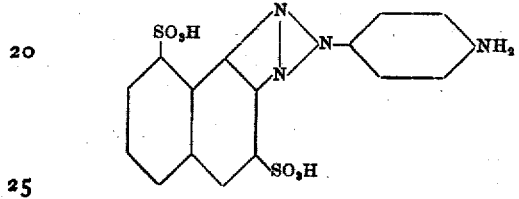

with beta-naphthol-3.6-disulfonic acid, by converting the alkali salts of this azo color into the salts of an alkaline earth metal, of an earth metal, or of another suitable metal. Azo colors of a constitution like the above have heretofore not been used in the art of lake-making. Hence one could not foresee whether such an azo coloring-matter would be a suitable starting product for the manufacture of valuable lake pigments or not.

As to the manufacture of the above dyestuff, the para-amido-phenyl-1.2-naphthyl-triazol-3.8-disulfonic acid which is to be diazotized and then combined with the beta-naphthol-3.6-disulfonic acid is obtained in the following manner: The 1-naphthylamin 3.8-disulfonic acid

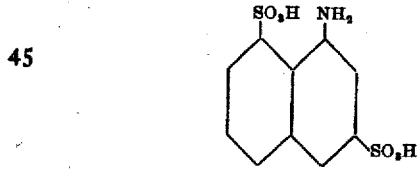

is acted on in the usual manner with the diazo compound of para-nitranilin and the resulting monoazo dyestuff

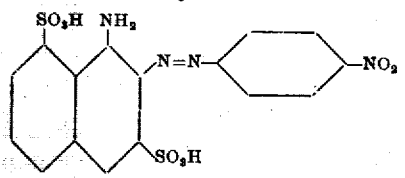

treated with a suitable oxidizing agent such as peroxid of lead, obtaining thus the para-nitrophenyl-1.2-naphthyl-triazol-3.8-disulfonic acid

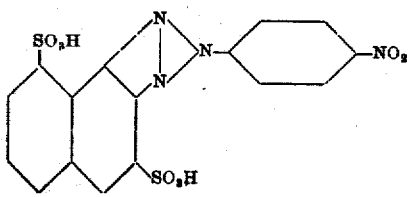

which on reduction yields the above-named corresponding amido compound serving as starting product for the diazotizing and combining process.

In order to manufacture such violet lakes, the alkali salts of the said dyestuff are dissolved or suspended in water and a solution of a metallic salt of the above-named classes—as for instance, a salt of barium, calcium, strontium, magnesium, or the oxid or hydroxid of one of these metals or a mixture of such compounds—is added in the cold or while heating. It is preferable to add before or after precipitation a suitable substratum—such as sulfate of calcium, hydroxid of aluminium, or the like. The lakes are then filtered and dried. They possess a clear violet color and are most difficultly soluble or nearly insoluble in water. When applied to a surface, they yield clear violet coatings of a good fastness against the action of light.

The following example may serve to illustrate our invention, the parts being by weight: One hundred parts of a paste containing about twenty per cent. of the sodium salt of the azo dyestuff, which is obtained by combining the diazo compound of the para-amido-phenyl-1.2-naphthyl-triazol-3.8-disulfonic acid with beta-naphthol-3.6-disulfonic acid, are well mixed with about one thousand parts of water and then the mass heated to 80° to 90° centigrade. Then is added thereto, while stirring well, an aqueous solution of seventy to eighty parts of crystallized barium chlorid and for some further time agitated, the temperature of 80° to 90° being maintained. Now one thousand parts of a freshly-prepared paste of aluminium hydroxid containing about three per cent. thereof are introduced, the mass being well stirred. Agitation having been continued for some time, one heats the whole to the boil and filters under pressure, whereafter the residue is dried and very finely ground. The clear violet powder thus obtained when applied to a surface yields clear violet coatings of a good fastness to light.

It is obvious to those skilled in the art that there may be made many variations of the foregoing example, relating to the proportions of the ingredients as well as to the special kind of the alkaline earth metal used or the substratum used, without departing from the scope of our invention.

Having now described our invention and in what manner the same can be carried out, what we claim is—

1. The process for the manufacture of new violet-color lakes which process consists in converting the alkali salts of the dyestuff which is obtained by combining the diazo compound of the para-amido-phenyl-1.2-naphthyl-triazol-3.8-disulfonic acid with beta-naphthol-3.6-disulfonic acid, into difficultly-soluble metal salts, preferably in the presence of a substratum.

2. As new articles of manufacture the new violet-color lakes prepared by converting an alkali—salt of the azo color as defined in the foregoing specification, into an insoluble salt, said lakes being distinguished by a clear violet color, a great insolubility in water and a good fastness to light, these lakes being split up by the action of a strong reducing agent yielding thereby para-amido-phenyl-1.2-naphthyl-triazol-3.8-disulfonic acid besides an amido-naphthol-disulfonic acid.

3. As a new article of manufacture the new violet-color lake prepared by converting the azo dyestuff: para-amido-phenyl-1.2-naphthyl-triazol-3.8-disulfonic acid-azo-2-naphthol-3.8-disulfonic acid into an insoluble salt by means of barium chlorid in the presence of aluminium hydroxid, said lake being a violet powder practically insoluble in water and insoluble in alcohol, which powder when applied to a surface yields clear violet coatings and which powder when treated with the solution of an alkali in the heat is decomposed and converted into the corresponding alkali salt of the said dyestuff and from which solution of the alkali salt, by a treatment with strong reducing agents, para-amido-phenyl-1.2-naphthyl-triazol-3.8-disulfonic acid is obtained besides amido-naphthol-disulfonic acid.

In witness whereof we have hereunto signed our names, this 1st day of October, 1905, in the presence of two subscribing witnesses.

RICHARD KIRCHHOFF.
LEO KERKOVIUS.

Witnesses:
HENRY HASPER,
WOLDEMAR HAUPT.